(12) United States Patent
Sakai et al.

(10) Patent No.: US 9,977,233 B1
(45) Date of Patent: May 22, 2018

(54) ELECTROWETTING DISPLAY LIGHT DIFFUSER

(71) Applicant: Amazon Technologies, Inc., Seattle, WA (US)

(72) Inventors: Toru Sakai, Waalre (NL); Tulasi Sridhar Reddy Guntaka, Eindhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 354 days.

(21) Appl. No.: 14/501,689

(22) Filed: Sep. 30, 2014

(51) Int. Cl.
*G02B 26/00* (2006.01)

(52) U.S. Cl.
CPC .................. *G02B 26/005* (2013.01)

(58) Field of Classification Search
CPC ...... G02B 3/14; G02B 26/004; G02B 26/005; G02B 2207/115; G02F 1/167; G09G 3/344; G09G 3/348

USPC ....... 359/253, 290, 291, 296, 297, 665, 832; 345/60; 438/57
See application file for complete search history.

(56) References Cited

U.S. PATENT DOCUMENTS

| | | | |
|---|---|---|---|
| 2007/0216987 A1* | 9/2007 | Hagood | G02B 26/02 359/298 |
| 2011/0140996 A1* | 6/2011 | Parry-Jones | G02B 26/005 345/60 |
| 2015/0293347 A1* | 10/2015 | Kreit | G02F 1/172 359/290 |

\* cited by examiner

*Primary Examiner* — Ricky Mack
*Assistant Examiner* — Gary O'Neill
(74) *Attorney, Agent, or Firm* — EIP US LLP (57) ABSTRACT

An electrowetting display comprises a first support plate, a second support plate substantially parallel to the first support plate, an electrolyte solution disposed between the first support plate and the second support plate, and a plurality of transparent diffuser elements protruding into the electrolyte solution from non-contiguous areas of the second support plate. Recesses separate the transparent diffuser elements.

18 Claims, 8 Drawing Sheets

ELECTROWETTING DISPLAY LIGHT DIFFUSER

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for assembling electronic devices including these components for the electrowetting displays and other features described herein.

In some embodiments, an electrowetting display device includes a bottom support plate and a top support plate and a plurality of pixel regions therebetween. Each of the pixel regions may include a hydrophobic surface on the bottom support plate, an electrowetting oil on the hydrophobic surface, and an electrolyte solution at least partially surrounding the electrowetting oil.

A plurality of diffuser elements may protrude into the electrolyte solution from a first non-contiguous area of the top support plate. Such diffuser elements may diffuse light incident on the electrowetting display device. In the case of a reflective electrowetting display device, the diffuser elements may also diffuse light that reflects outward from the electrowetting display device. Such light diffusion may improve the quality of images rendered by the electrowetting display device. In particular, reflective electrowetting display devices may be specular, as opposed to being Lambertian-type reflectors. Accordingly, diffusing light reflecting from such reflectors prevents excess glare, for example.

A display device, such as an electrowetting display device, may be a transmissive, reflective or transflective display that generally includes an array of display elements (e.g., pixels or subpixels) configured to be operated by an active matrix addressing scheme. For example, rows and columns of electrowetting elements are operated by controlling voltage levels on a plurality of source lines and gate lines. In this fashion, the display device may produce an image by selecting particular display elements to transmit, reflect or block light. Display elements are addressed (e.g., selected) via rows and columns of the source lines and gate lines that are electrically connected to transistors (e.g., used as switches) included in each display element. Transistors take up a relatively small fraction of the area of each display element to allow light to efficiently pass through (or reflect from) the display element. Herein, a display element may, unless otherwise specified, comprise a pixel or subpixel of an electrowetting display device. Such a pixel or subpixel may be the smallest light transmissive, reflective or transflective element of a display that is individually operable to directly control an amount of light transmission through or reflection from the element. For example, in some implementations, a display element may be a pixel that includes a red subpixel, a green subpixel, and a blue subpixel. In other implementations, a display element may be a pixel that is a smallest component, e.g., the pixel does not include any subpixels.

Electrowetting displays include an array of display elements comprising pixels and/or subpixels sandwiched between two support plates, such as a bottom support plate and a top support plate. For example, a bottom support plate in cooperation with a top support plate may contain display elements that include electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example.

Display elements include various layers of materials built upon a bottom support plate. One such layer may be a hydrophobic fluoropolymer (AF) upon which pixel walls are built.

Hereinafter, example embodiments include, but are not limited to, reflective electrowetting displays that include a clear top support plate and a bottom support plate, which need not be transparent. The clear top support plate may comprise glass or any of a number of transparent materials, such as plastic, quartz, semiconductors, and so on, and claimed subject matter is not limited in this respect. "Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate may be opaque while the top support plate is transparent. Herein, describing an element or material as being "transparent" means that the element or material may transmit a relatively large fraction of the light incident upon it. For example, a transparent material or layer may transmit more than 70% or 80% of the light impinging on its surface, though claimed subject matter is not limited in this respect.

In some embodiments, diffuser elements protrude out from the top support plate and into the underlying electrolyte solution. Such diffuser elements may comprise a transparent material having a relatively high refractive index (e.g., greater than about 1.5). Light incident upon the electrowetting display device travels through the top plate and into the diffuser elements, which refract the light at various angles toward a reflective surface on the bottom support plate of the display elements. Light reflected from the reflective surface again passes through the diffuser elements and again gets refracted at various angles as the light exits the top plate toward a viewer, for example. Such refraction at various angles creates diffused light, which leads to a desirable image rendered by the electrowetting display device.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid.

Individual reflective electrowetting display elements may include a reflective layer on the bottom support plate of the electrowetting display element, a transparent electrode layer adjacent to the reflective layer, and a hydrophobic layer on the electrode layer. Pixel walls of each display element, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each display element.

In addition to display elements, spacers and edge seals may also be located between two support plates. Support plates may comprise any of a number of materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting display device elements, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

Figure 1:
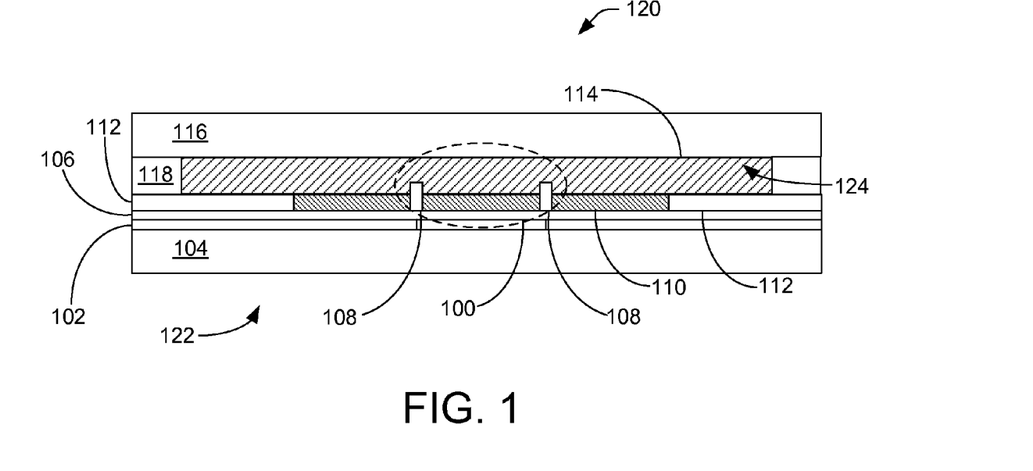
FIG. 1 illustrates a cross-section of a portion of an electrowetting display device, according to some embodiments.

FIG. 1 is a cross-section of a portion of a reflective electrowetting display device illustrating several electrowetting display elements 100, according to some embodiments. Though three such electrowetting display elements are illustrated, an electrowetting display device may include any number (usually a very large number, such as thousands or millions) of electrowetting display elements. An electrode layer 102 is formed on a bottom support plate 104.

In various embodiments, electrode layer 102 may be connected to any number of thin film transistors (TFTs) that are switched to either select or deselect electrowetting display elements 100 using active matrix addressing, for example. A TFT is a particular type of field-effect transistor that includes thin films of an active semiconductor layer as well as a dielectric layer and metallic contacts over a supporting (but non-conducting) substrate, which may be glass or any of a number of other transparent or non-transparent materials, for example.

In some implementations, a dielectric barrier layer (not illustrated in FIG. 1) may at least partially separate electrode layer 102 from an AF layer 106 also formed on bottom support plate 104. Such separation may, among other things, prevent electrolysis occurring through AF layer 106. In some implementations, AF layer 106 may comprise any of a number of types of fluoropolymers, such as AF1600, produced by DuPont, based in Wilmington, Del. AF layer 106 may also be any of a number of water-repelling materials that affect wettability of an adjacent material, for example.

Pixel walls 108 form a patterned electrowetting element grid on AF layer 106. Pixel walls 108 may comprise a photoresist material such as, for example, epoxy-based negative photoresist SU-8. The patterned electrowetting element grid comprises rows and columns that form an array of electrowetting display elements. For example, an electrowetting display element may have a width and length in a range of about 50 to 500 microns.

A first fluid 110, which may have a thickness (e.g., depth) in a range of about 1 to 10 microns, for example, overlays AF layer 106. First fluid 110 is partitioned by pixel walls 108 of the patterned electrowetting element grid. An outer rim 112 may comprise the same material as pixel walls 108. A second fluid 114, such as an electrolyte solution, overlays first fluid 110 and pixel walls 108 of the patterned electrowetting element grid. An electrolyte solution may be electrically conductive and/or polar. For example, an electrolyte solution may be, among other things, a water or a salt solution such as potassium chloride water. First fluid 110 is immiscible with second fluid 114.

A support plate 116 covers second fluid 114 and edge seals 118 maintain second fluid 114 over the electrowetting display element array. Support plate 116 may be supported by edge seals 118 and spacers (not illustrated) that extend up to support plate 116 and are interspersed throughout the array of display elements 100. The support plate may be made of glass or polymer and may be rigid or flexible, for example. In some implementations, TFTs (not shown) are fabricated onto support plate 116.

A voltage applied across, among other things, second fluid 114 and AF layer 106 of individual electrowetting display elements may control transmittance or reflectance of the individual electrowetting display elements.

The reflective electrowetting display device has a viewing side 120 on which an image formed by the electrowetting display device may be viewed, and a rear side 122. Support plate 116 faces viewing side 120 and bottom support plate 104 faces rear side 122. The reflective electrowetting display device may be a segmented display type in which the image is built up of segments. The segments may be switched simultaneously or separately. Each segment includes one electrowetting display element 100 or a number of electrowetting display elements 100 that may be neighboring or distant from one another. Electrowetting display elements 100 included in one segment are switched simultaneously, for example. The electrowetting display device may also be an active matrix driven display type or a passive matrix driven display, just to name a few examples.

As mentioned above, second fluid 114 is immiscible with first fluid 110. Herein, substances are immiscible with one another if the substances do not substantially form a solution. Second fluid 114 is electrically conductive and/or polar, and may be water or a salt solution such as a solution of potassium chloride in a mixture of water and ethyl alcohol, for example. Second fluid 114 is preferably transparent, but may be colored or absorbing. First fluid 110 is electrically non-conductive and may for instance be an alkane like hexadecane or (silicone) oil.

AF layer 106 is arranged on bottom support plate 104 to create an electrowetting surface area. The hydrophobic character causes first fluid 110 to adhere preferentially to bottom support plate 104 since first fluid 110 has a higher wettability with respect to the surface of AF layer 106 than second fluid 114. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 110 absorbs at least a part of the optical spectrum. First fluid 110 may be transmissive for a part of the optical spectrum, forming a color filter. For this purpose, the fluid may be colored by addition of pigment particles or dye, for example. Alternatively, first fluid 110 may be black (e.g., absorbing substantially all parts of the optical spectrum) or reflecting. Hydrophobic layer 106 may be transparent or reflective. A reflective layer may reflect the entire visible spectrum, making the layer appear white, or part of it, making it have a color.

If a voltage is applied across electrowetting display element 100, electrowetting display element 100 will enter into an active state. Electrostatic forces will move second fluid 114 toward electrode layer 102, thereby displacing first fluid 110 from the area of AF layer 106 to pixel walls 108 surrounding the area of AF layer 106, to a droplet-like form. Such displacing action uncovers first fluid 110 from the surface of AF layer 106 of electrowetting display element 100.

If the voltage across electrowetting display element 100 is returned to an inactive signal level of zero or a value near to zero, electrowetting display element 100 will return to an inactive state, where first fluid 110 flows back to cover AF layer 106. In this way, first fluid 110 forms an electrically controllable optical switch in each electrowetting display element 100. Of course, such details of an electrowetting display device are merely examples, and claimed subject matter is not limited in this respect.

In some embodiments, diffuser elements 124 may protrude into second fluid 114 from support plate 116. The diffuser elements may comprise a high-index transparent material. In some implementations, at least some of the diffuser elements may comprise a color absorbing material or a color filter. In this case, the diffuser elements may act to diffuse light and act as a color filter.

Figure 2:
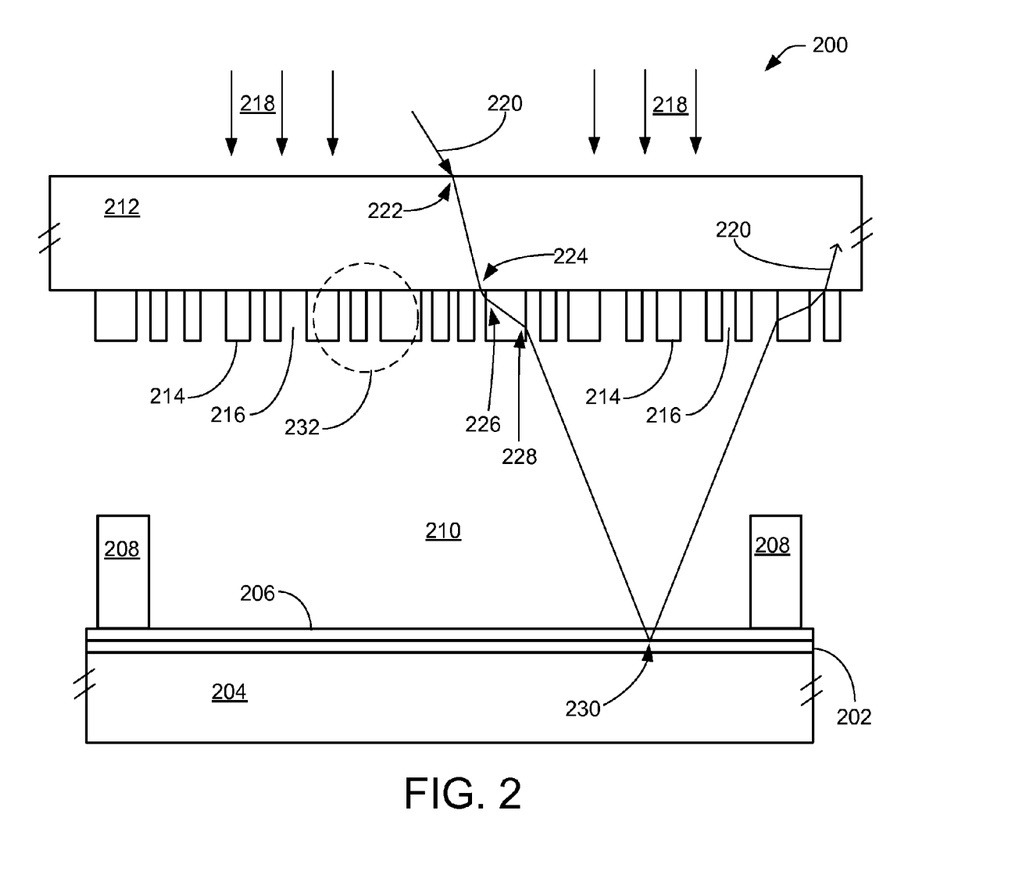
FIG. 2 illustrates a cross-section of a pixel region of an electrowetting display device, according to various embodiments.

FIG. 2 illustrates a cross-section of a pixel region 200 of an electrowetting display device, according to various embodiments. For example, pixel region 200 may be the same as or similar to electrowetting display element 100 illustrated in FIG. 1. An electrode layer 202 at least partially covers a bottom support plate 204. Electrode layer 202 may comprise a metal having relatively high reflectance. Accordingly, electrode layer 202 may reflect a relatively high percentage (e.g., greater than about 80%) of impinging light. An AF layer 206 may at least partially covers electrode layer 202. AF layer 206, comprising any of a number of types of fluoropolymers or other materials, may be substantially transparent. Pixel walls 208 that at least partially confine an electrowetting oil (not shown) to pixel region 200 are formed on AF layer 206. An electrolyte solution 210 covers the electrowetting oil, pixel walls 208, and AF layer 206. Electrolyte solution 210 may also at least partially fill a volume between bottom support plate 204 and a top support plate 212. For example, electrolyte solution 210 may be similar to or the same as second fluid 114, illustrated in FIG. 1.

In some embodiments, diffuser elements 214 protrude from top support plate 212 into electrolyte solution 210. In some implementations, diffuser elements 214 are formed (e.g., by a deposition process) on top support plate 212. In other implementations, diffuser elements 214 are laminated onto top support plate 212. In still other implementations, diffuser elements 214 are formed by etching top support plate 212. Diffuser elements 214 may comprise a high-index transparent material. In some implementations, at least some of diffuser elements 214 may comprise a color filter.

Recesses 216 separate adjacent diffuser elements 214. Recesses 216 may be at least partially filled with electrolyte solution 210. Top support plate 212 may include electronic circuitry and an electrode layer, which are not illustrated in FIG. 2 for sake of clarity. For example, such circuitry and electrode layer may comprise a transparent conductive material, such as indium tin oxide (ITO). At least portions of the electrode later may be in electrical contact with electrolyte solution 210.

Arrows 218 indicate a direction of incident light that may illuminate the electrowetting display device to form an image. A light ray 220 is a particular example of the incident light. As light ray 220 travels across various optical interfaces, the light ray is refracted or angularly redirected due to a difference between refractive indices of the materials across the interface. Such interfaces include an air to top support plate interface, a top support plate to recess interface, an electrolyte solution to diffuser interface, and so on. Because recesses 216 may be filled with electrolyte solution 210, the top support plate to recess interface may be the same as a top support plate to electrolyte solution interface.

Upon penetrating top support plate 212 at region 222, the direction of light 220 changes by refraction. Light 220 exits top support plate 212 at region 224 and is refracted toward another direction. If light exits top support plate 212, the light may immediately enter either diffuser element 214 or recess 216. In the case for light 220, region 224 is at a recess. Accordingly, light 220 enters recess 216 upon exiting top support plate 212. As light 220 enters recess 216, it is refracted to a new angle and enters diffuser element 214 at region 226. Upon entering diffuser element 214, light 220 is again refracted and exits diffuser element 214 at region 228. Light 220 is subsequently directed toward reflective electrode layer 202 where it reflects at a region 230. The reflected light 220 may pass through one or more diffuser elements 214 and/or recesses 216 before it passes into top support plate 212.

Incident light (e.g., entering the electrowetting display device) and reflected light (e.g., reflecting from reflective electrode layer 202) may pass through diffuser elements one or more times, leading to diffusion of the incident light.

A region indicated by circle 232 is shown is detail in FIGS. 3-5 below.

Figure 3:
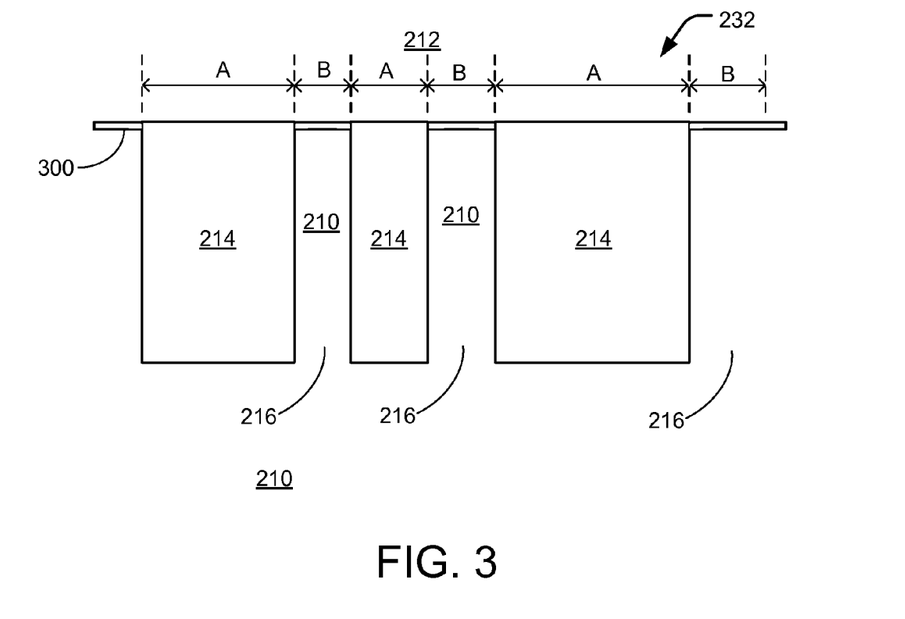
FIGS. 3-5 illustrate close-up cross-sectional views of a portion of an electrowetting display element, according to some embodiments.

FIG. 3 illustrates a close-up cross-sectional view of portion 232, illustrated in FIG. 2, of an electrowetting display element, according to some embodiments. Top support plate 212 includes diffuser elements 214 and recesses 216. A top electrode layer 300 may be disposed on bottoms of recesses 216 between diffuser elements 214. Top electrode layer 300 may comprise ITO, which is transparent. Electrolyte solution 210 may at least partially fill recesses 216 and be in electrical contact with at least a portion of top electrode layer 300. Diffuser elements 214 may be columns, bumps, short walls, ridges, posts, cylinders, pyramids, and hemispheres, just to name a few examples of various shapes.

"A" and "B" indicate areas of top support plate 212 that are either adjacent to diffuser elements 214 or recesses 216. In particular, diffuser elements 214 protrude into the electrolyte solution from first non-contiguous areas A of top support plate 212. Second non-contiguous areas B of top support plate 212 correspond to locations of recesses 216 that are among diffuser elements 214.

Figure 4:
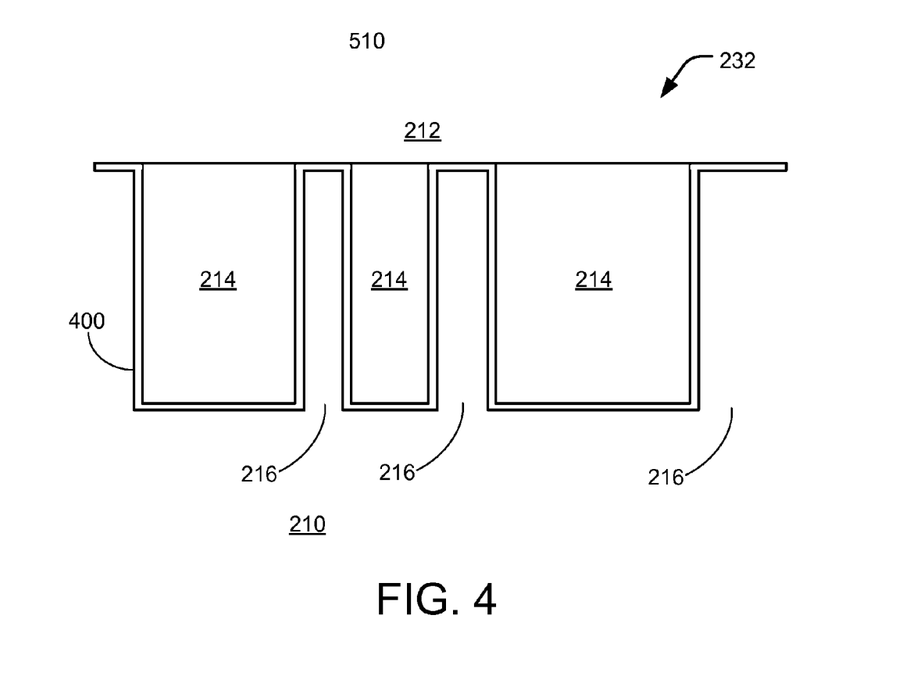

FIG. 4 illustrates a close-up cross-sectional view of portion 232, illustrated in FIG. 2, of an electrowetting display element, according to other embodiments. For example, embodiments illustrated in FIG. 4 may be almost the same as embodiments illustrated in FIG. 3, except for differences in the configuration of a top electrode layer. Top support plate 212 includes diffuser elements 214 and recesses 216. A top electrode layer 400 may be conformally disposed on diffuser elements 214 and sides and bottoms of recesses 216. Top electrode layer 400 may comprise ITO. Electrolyte solution 210 may at least partially fill recesses 216 and be in electrical contact with top electrode layer 400 in recesses 216 and/or be in contact with top electrode layer 400 on diffuser elements 214.

Figure 5:
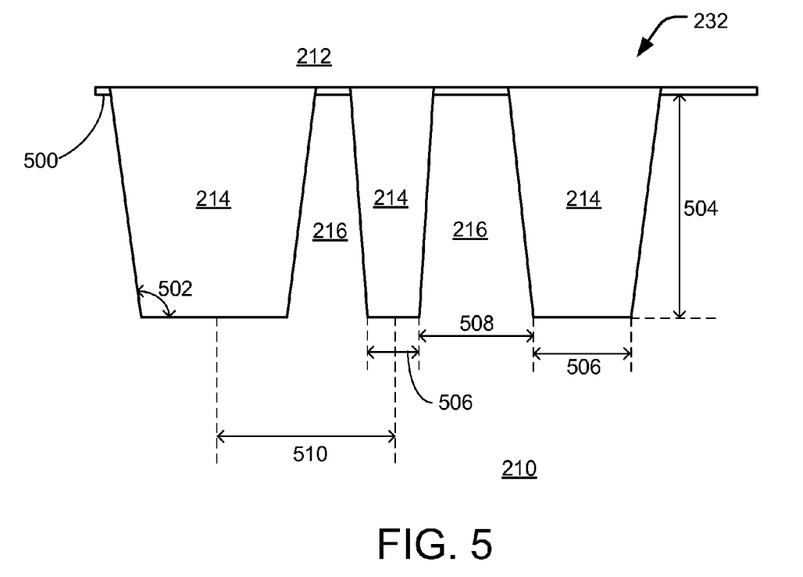

FIG. 5 illustrates a close-up cross-sectional view of portion 232, illustrated in FIG. 2, of an electrowetting display element, according to other embodiments. For example, embodiments illustrated in FIG. 5 may be almost the same as embodiments illustrated in FIG. 3, except for differences in the configuration of diffuser elements 214. Top support plate 212 includes diffuser elements 214 and recesses 216. A top electrode layer 500 may be disposed on bottoms of recesses 216, for example. Electrolyte solution 210 may at least partially fill recesses 216 and be in electrical contact with top electrode layer 500 in recesses 216.

Diffuser elements 214 need not be rectilinearly shaped. Diffuser elements 214 may be straight or tapered. For example, an angle 502 between sides and a top of diffuser elements 214 may be from about 50 degrees up to about 130 degrees. Diffuser elements 214 may be spherical, cubic, hexagonal, and so on. Heights 504 of diffuser elements 214, or equivalently, depths of recesses 216, may range from about 500 nanometers up to about one micron. Widths 506 of diffuser elements 214 may range from a few microns up to tens of microns. Widths 508 of recesses 216 may range from a few microns up to tens of microns. Distances 510 between adjacent diffuser elements 214, or equivalently, widths of recesses 216, may range from a few microns up to tens of microns.

The amount or degree of light diffusion performed by diffuser elements 214 and recesses 216 may depend, at least in part, on the refractive indices of top support plate 212, electrolyte solution 210, diffuser elements 214, distances 510 between adjacent diffuser elements 214, dimensions and shape of diffuser elements 214, and angle 502, for example. In some implementations, a refractive index of diffuser elements 214 is greater than a refractive index of top support plate 212. Generally, it may be desirable for individual pixel regions to include more than fifty or a hundred (e.g., thousands) diffuser elements 214.

Figure 6:
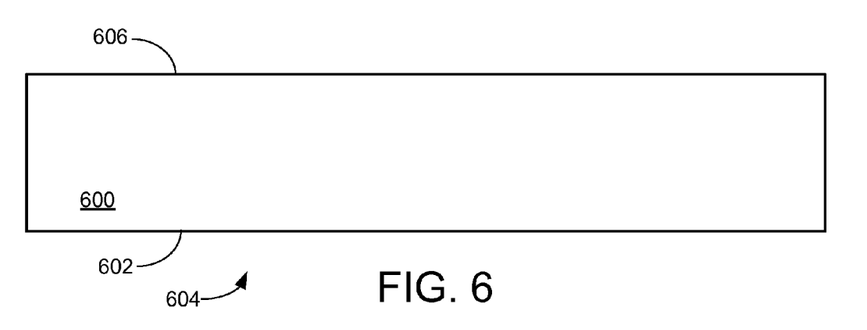
FIGS. 6-8 illustrate portions of an etching process for fabricating a top portion of an electrowetting display, according to some embodiments.
Figure 7:
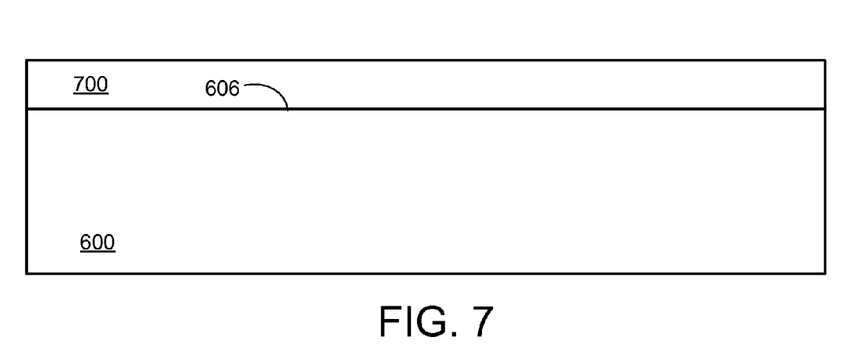
Figure 8:
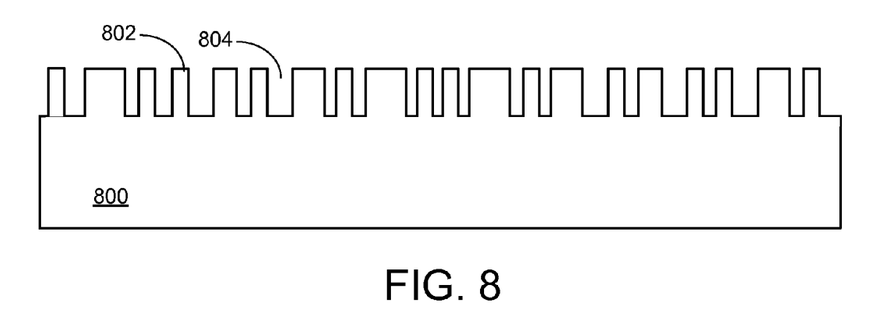

FIGS. 6-8 illustrate portions of a process for fabricating a top portion of an electrowetting display, according to some embodiments involving etching a top support plate using a patterned mask.

FIG. 6 illustrates a top support plate 600. As mentioned above, top support plate 600 may comprise a transparent material such as, for example, glass or polymer and may be rigid or flexible. With respect to top support plates illustrated in FIGS. 1-5, top support plate 600 is illustrated as being inverted ("upside down") in FIG. 6. In other words, with respect to the display device resulting from the fabricating process, a first side 602 of top support plate 600 faces a viewing side 604 and a second side 606 of top support plate 600 faces a side of top support plate 600 that will include diffuser elements.

FIG. 7 illustrates a mask 700 on second side 606 of top support plate 600. Mask 700 may be placed on top support plate 600 by a deposition process, for example. In other implementations, mask 700 may comprise a sheet-like mask that is placed over top support plate 600. Mask 700 may include a pattern for diffuser elements and concomitant recesses. In some example implementations, such a pattern may be structured so that diffuser elements will be randomly positioned across top support plate 600. In other example implementations, such a pattern may be structured so that diffuser elements will be positioned across top support plate 600 along concentric circles.

FIG. 8 illustrates a top support plate 800 that may result from an etching process using mask 700 on second side 606 of top support plate 600, as illustrated in FIG. 7. Top support plate 800 includes diffuser elements 802 and recesses 804. Referring to FIG. 7, the etching process includes etching top support plate 600 using mask 700 to selectively etch (e.g., remove) portions of top support plate 600 to a depth of recesses 804. Remaining portions of top support plate 600 (portions not substantially etched) become raised diffuser elements 802. In the case where mask 700 was deposited on top support plate 600 by a deposition process, an etching process may be used to remove mask 700 from top support plate 800 subsequent to the etching process that results in diffuser elements 802, for example. Top support plate 800 may be similar to or the same as the structure illustrated in FIG. 2 that includes top support plate 212, diffuser elements 214, and recesses 216, for example. Top support plate 800 and diffuser elements 802 may comprise a unitary structure.

Figure 9:
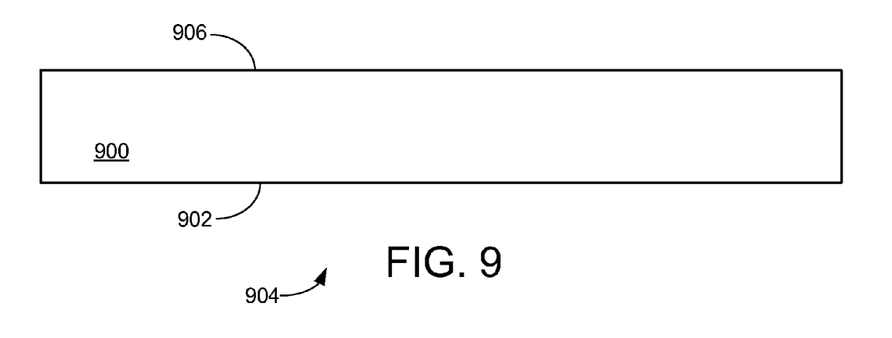
FIGS. 9-11 illustrate portions of a lithography process for fabricating a top portion of an electrowetting display, according to some embodiments.
Figure 10:
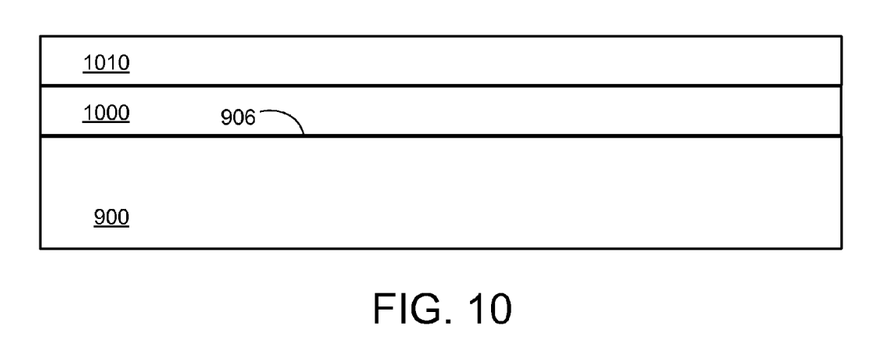
Figure 11:
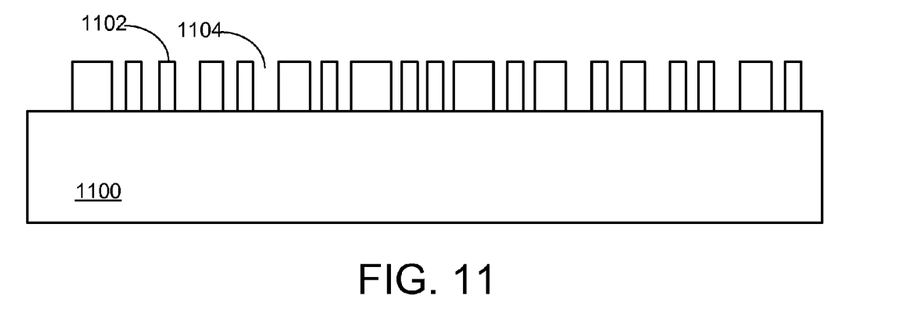

FIGS. 9-11 illustrate portions of a process for fabricating a top portion of an electrowetting display, according to some embodiments involving photolithography.

FIG. 9 illustrates a top support plate 900. Top support plate 900 may comprise a transparent material such as, for example, glass or polymer and may be rigid or flexible. With respect to top support plates illustrated in FIGS. 1-5, top support plate 900 is illustrated as being inverted ("upside down") in FIG. 9. In other words, with respect to the display device resulting from the fabricating process, a first side 902 of top support plate 900 faces a viewing side 904 and a second side 906 of top support plate 900 faces a side of top support plate 900 that will include diffuser elements.

FIG. 10 illustrates a diffuser layer 1000 on second side 906 of top support plate 900. Diffuser layer 1000 may be placed on top support plate 900 by a deposition process, for example. In other implementations, diffuser layer 1000 may comprise a sheet-like material that is adhered onto top support plate 900. Diffuser layer 1000 may comprise a transparent material having a relatively high refractive index (e.g., greater than about 1.5). A thickness of diffuser layer 1000 may be greater than or equal to an anticipated depth of recesses that will be formed subsequent to etching diffuser layer 1000, as described below.

A Lithography mask 1010 may be placed onto or over diffuser layer 1000. Lithography mask 1010 may include a pattern for diffuser elements and concomitant recesses. In some example implementations, such a pattern may be structured so that diffuser elements will be randomly positioned across top support plate 900. In other example implementations, such a pattern may be structured so that diffuser elements will be positioned across top support plate 900 along concentric circles.

FIG. 11 illustrates a top support plate 1100 that may result from a lithographic process using lithography mask 1010 on diffuser layer 1000, as illustrated in FIG. 10. Top support plate 1100 includes diffuser elements 1102 and recesses 1104. Referring to FIG. 10, the lithographic process includes etching diffuser layer 1000 using lithography mask 1010 to selectively etch (e.g., remove) portions of diffuser layer 1000 to a depth of recesses 1104. Such a depth may be at least approximately equal to a thickness of diffuser layer 1000. In some implementations, however, such a depth may be less than a thickness of diffuser layer 1000 so that bottoms of recesses 1104 include remaining portions (e.g., portions not etched) of diffuser layer 1000 overlying top support plate 900.

Portions of top support plate 900 not substantially etched become raised diffuser elements 802. Top support plate 1100 may be similar to or the same as the structure illustrated in FIG. 2 that includes top support plate 212, diffuser elements 214, and recesses 216, for example.

Figure 12:
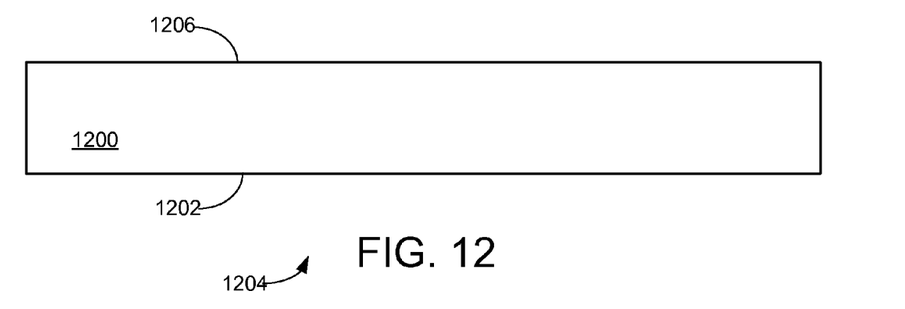
FIGS. 12-14 illustrate portions of a laminating process for fabricating a top portion of an electrowetting display, according to some embodiments.
Figure 13:
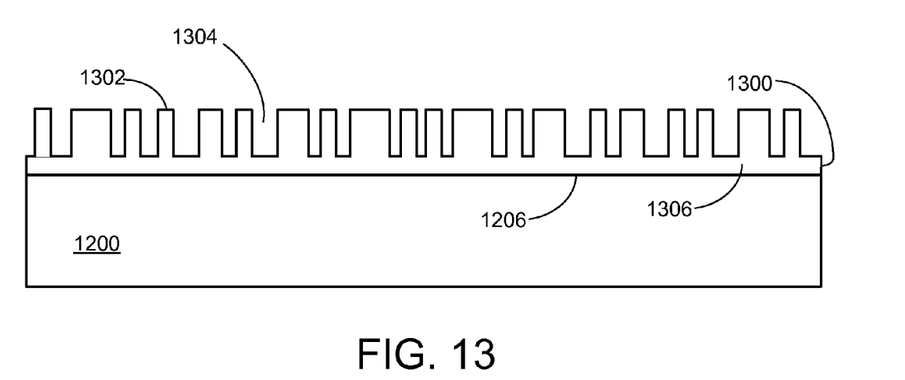
Figure 14:
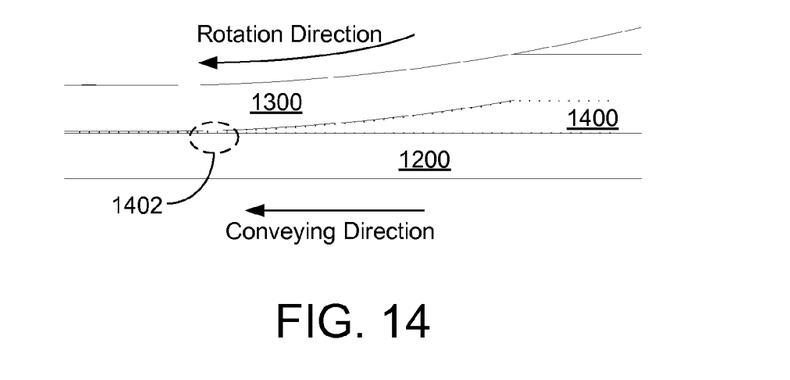

FIGS. 12-14 illustrate portions of a process for fabricating a top portion of an electrowetting display, according to some embodiments involving lamination.

FIG. 12 illustrates a top support plate 1200. Top support plate 1200 may comprise a transparent material such as, for example, glass or polymer and may be rigid or flexible. With respect to top support plates illustrated in FIGS. 1-5, top support plate 1200 is illustrated as being inverted ("upside down") in FIG. 12. In other words, with respect to the display device resulting from the fabricating process, a first side 1202 of top support plate 1200 faces a viewing side 1204 and a second side 1206 of top support plate 1200 faces a side of top support plate 1200 that will include diffuser elements.

FIG. 13 illustrates a diffuser layer 1300 on second side 1206 of top support plate 1200. Diffuser layer 1300 may be placed on top support plate 900 by a lamination process, for example. Diffuser layer 1300 may comprise a sheet-like material that is laminated onto top support plate 1300. Diffuser layer 1300 may comprise a transparent material having a relatively high refractive index (e.g., greater than about 1.5). Diffuser layer 1300 includes diffuser elements 1302 and recesses 1304. A base or transparent foil 1306 of diffuser layer 1300 may have a thickness sufficient to provide diffuser layer 1300 with resilience and strength to undergo the lamination process while keeping intact diffuser elements 1302, for example. Top support plate 1200 and diffuser elements 1302 may be similar to or the same as top support plate 212 and diffuser elements 214, illustrated in FIG. 2, for example.

FIG. 14 illustrates a process of laminating diffuser layer 1300 to top support plate 1200, according to some example embodiments. Rollers or other mechanical devices (not illustrated) may be used to bring diffuser layer 1300 and top support plate 1200 together, which are indicated to be moving toward the left of the figure. An adhesive 1400 may be used to laminate diffuser layer 1300 and top support plate 1200 together. Excess adhesive 1400 may be squeezed out as diffuser layer 1300 and top support plate 1200 are laminated together at a region 1402, for example.

Figure 15:
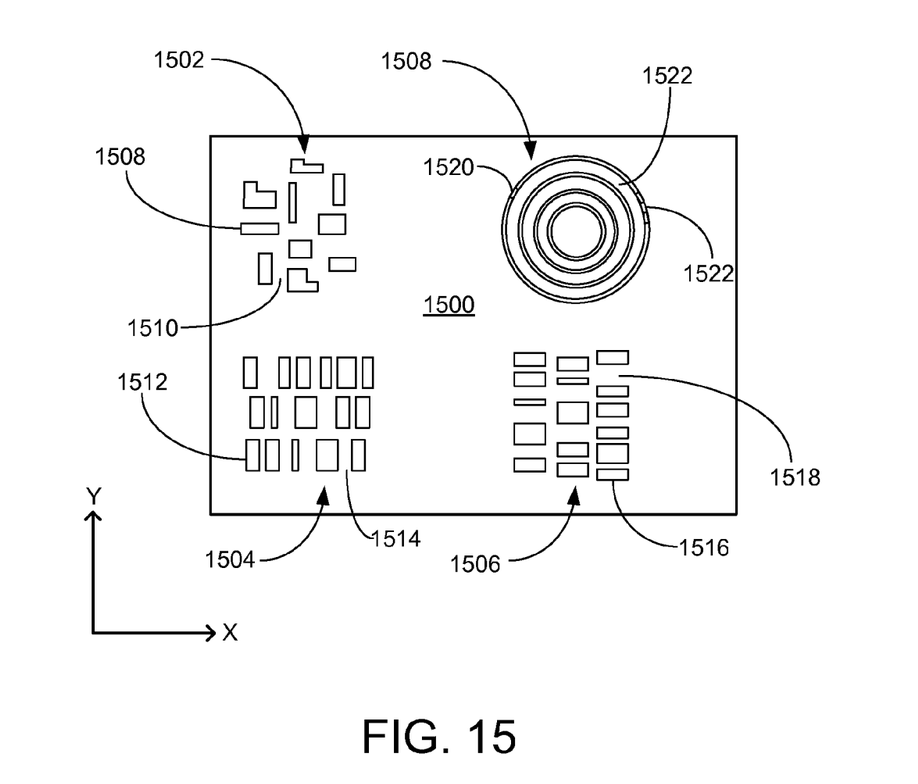
FIG. 15 illustrates a top view of an electrowetting display element including various arrangements of diffuser elements, according to some embodiments.

FIG. 15 illustrates a top view of an electrowetting display element 1500 including various arrangements 1502-1506 of diffuser elements, according to some embodiments. For reference, X and Y axes are shown to indicate directions. Electrowetting display element 1500 may be a pixel or subpixel of an electrowetting display device. Arrangements 1502-1506 are merely examples of possible arrangements, and claimed subject matter is not so limited.

Arrangement 1502 may comprise a plurality of diffuser elements 1508 that are arranged randomly across electrowetting display element 1500. Herein, when referring to positions or arrangements, "randomly" means that the positions do not fall into a repetitive or cyclic pattern on at least a local scale. For example, a local scale of electrowetting display element 1500 may range from about one-twentieth up to about one-fourth of the area of electrowetting display element 1500. Distances among diffuser elements 1508 of arrangement 1502 may vary randomly in both X and Y directions. Shapes of individual diffuser elements 1508 may be square, rectangular, trapezoidal, triangular, and so on. Recesses 1510 may be located among diffuser elements 1508.

Arrangement 1504 may comprise a plurality of diffuser elements 1512 that are arranged randomly across electrowetting display element 1500. Distances among diffuser elements 1512 of arrangement 1504 may vary randomly in rows along the X direction while the rows may be spaced regularly in the Y direction. Shapes of individual diffuser elements 1512 may be square, rectangular, trapezoidal, triangular, and so on. Recesses 1514 may be located among diffuser elements 1512.

Arrangement 1506 may comprise a plurality of diffuser elements 1516 that are arranged randomly across electrowetting display element 1500. Distances among diffuser elements 1516 of arrangement 1506 may vary randomly in columns along the Y direction while the columns may be spaced regularly in the X direction. Shapes of individual diffuser elements 1516 may be square, rectangular, trapezoidal, triangular, and so on. Recesses 1518 may be located among diffuser elements 1516.

Arrangement 1508 may comprise a plurality of diffuser elements 1520 that are arranged substantially along concentric circles or ovals (or other shapes, such as rectangles or squares may be used in other implementations) across electrowetting display element 1500. Distances among diffuser elements 1520 of arrangement 1508 may vary randomly along the concentric circles or ovals. Shapes of individual diffuser elements 1520 may be square, rectangular, trapezoidal, triangular, and so on. In some implementations, the concentric circles or ovals may be diffuser elements 1520 themselves. In other words, diffuser elements 1520 may comprise concentric circles or ovals (or other shapes, such as rectangles or squares). Recesses 1522 (which themselves may be concentric shapes) may be located among diffuser elements 1520.

Figure 16:
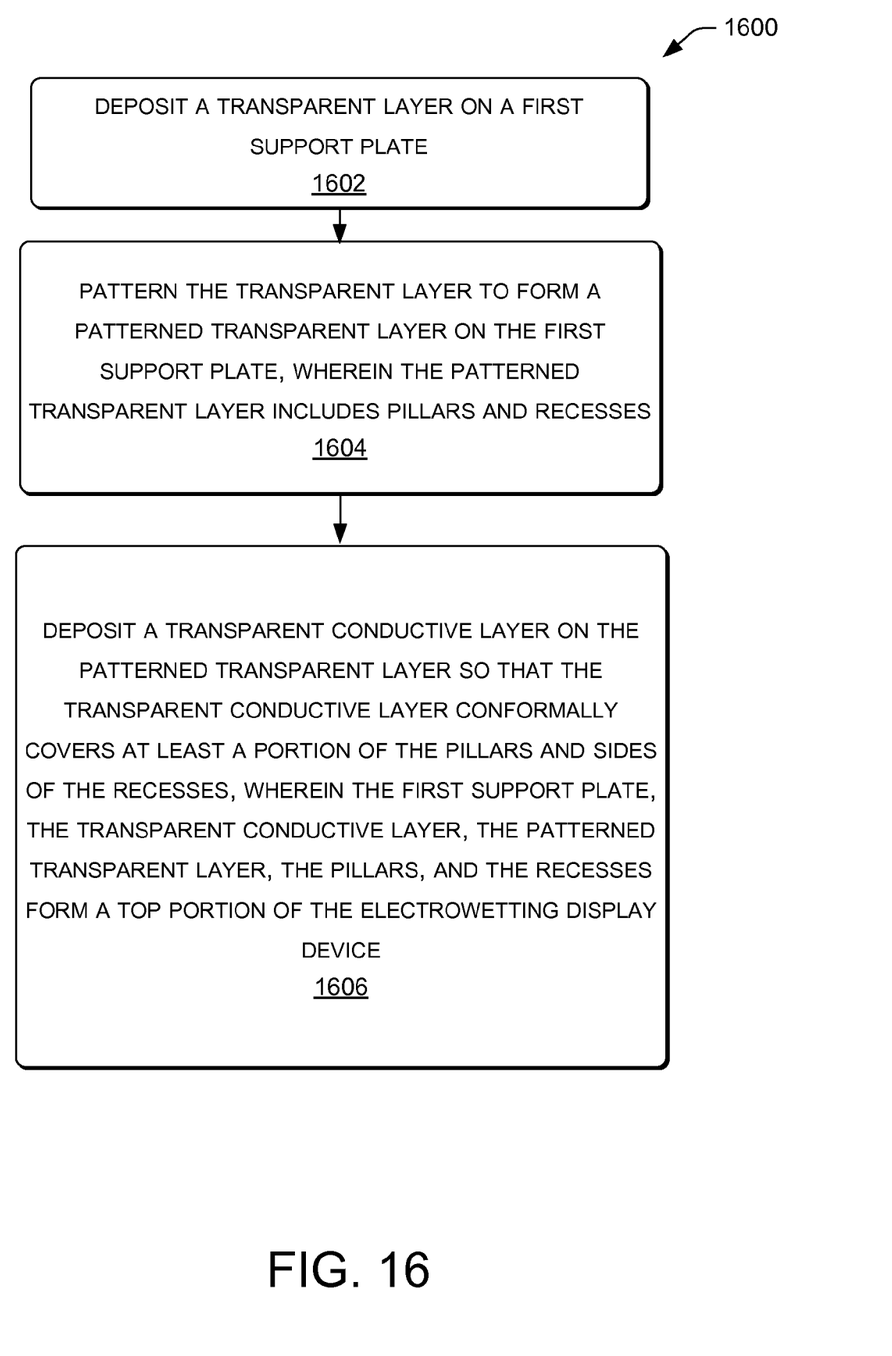
FIG. 16 is a flow diagram of a process for fabricating an electrowetting display device, according to various example embodiments.

FIG. 16 is a flow diagram of a process 1600 for fabricating an electrowetting display device, according to various example embodiments. For example, such a process, which may be performed by a fabricator, may be similar to or the same as processes shown in FIGS. 9-11. For example, a fabricator may comprise a person, a person operating an apparatus, a processor operating an apparatus, or any combination thereof. At block 1602, the fabricator may place a transparent layer on a first support plate by a deposition process. Such a deposition process may include, for example, chemical vapor deposition (CVD), physical vapor deposition (PVD), molecular beam epitaxy (MBE), sputtering, and so on. The transparent layer may comprise glass, plastic (e.g., a transparent thermoplastic such as PMMA or other acrylic), or other transparent material and may be made of a rigid or flexible material. At block 1604, the fabricator may pattern the transparent layer to form a patterned transparent layer on the first support plate, wherein the patterned transparent layer includes pillars and recesses. For example, a lithographic process incorporating a pattern mask may be used to form the patterned transparent layer. The pattern mask may include patterns for etching the recesses. At block 1606, the fabricator may deposit a transparent conductive layer on the patterned transparent layer so that the transparent conductive layer conformally covers at least a portion of the pillars and sides of the recesses. The first support plate, the transparent conductive layer, the patterned transparent layer, the pillars, and the recesses form a top portion of the electrowetting display device.

Figure 17:
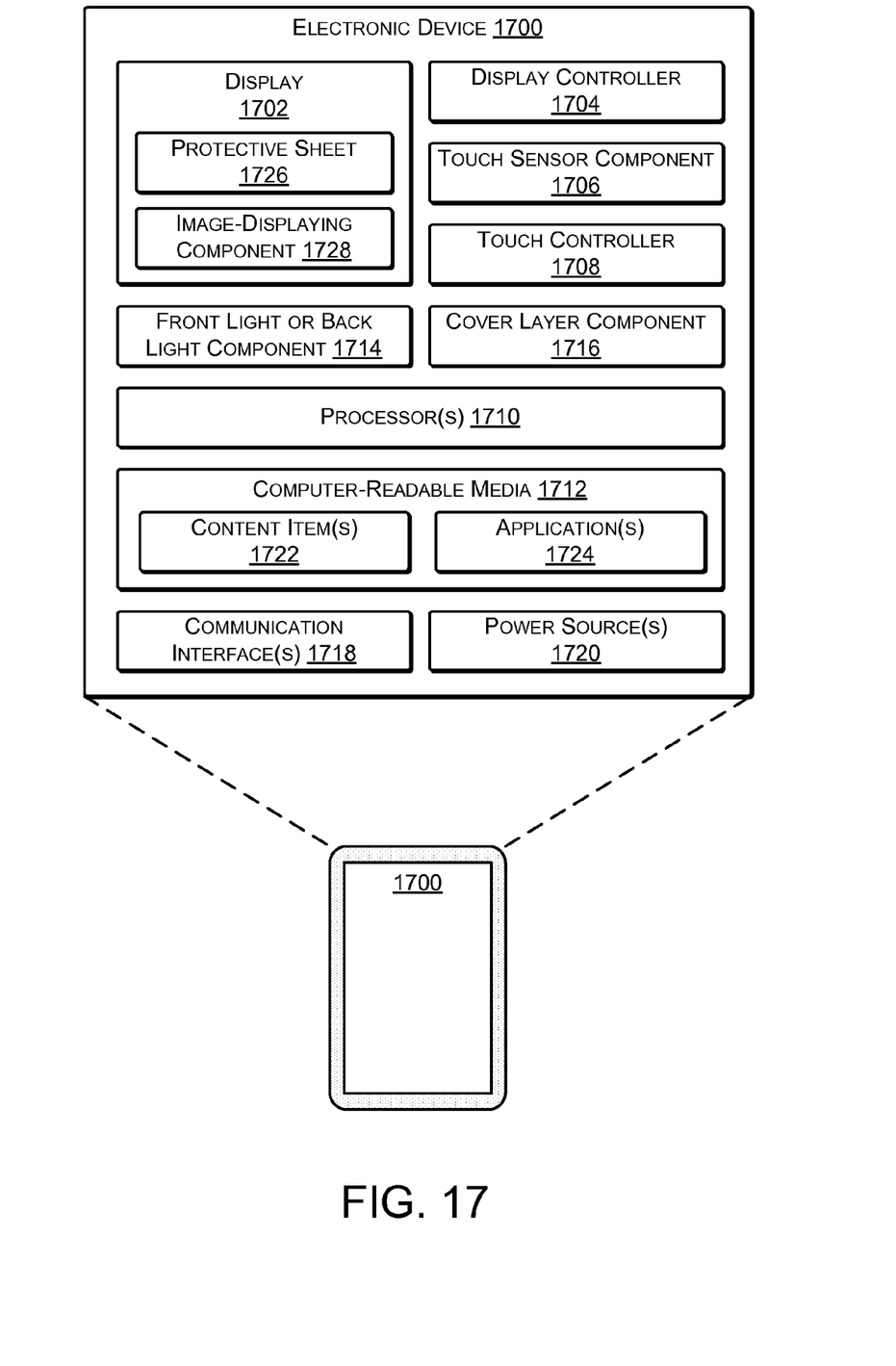
FIG. 17 illustrates an example electronic device that may incorporate a display device, according to some embodiments.

FIG. 17 illustrates an example electronic device 1700 that may incorporate any of the display devices discussed above. The device 1700 may comprise any type of electronic device having a display. For instance, the device 1700 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1700 may be a non-mobile electronic device (e.g., a computer display, a television, etc.). In addition, while FIG. 17 illustrates several example components of the electronic device 1700, it is to be appreciated that the device 1700 may also include other conventional components, such as an operating system, system busses, input/output components, and the like. Further, in other examples, such as in the case of a television or computer monitor, the electronic device 1700 may only include a subset of the components illustrated.

Regardless of the specific implementation of the electronic device 1700, the device 1700 includes a display 1702 and a corresponding display controller 1704. The display 1702 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even if very little or no power is supplied to the display. Some examples of the display 1702 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1700, the display 1702 may be an active display such as a fluid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 170 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1702 may represent a backlit display, examples of which are mentioned above.

In addition to including the display 1702, FIG. 17 illustrates that some examples of the device 1700 may include a touch sensor component 1706 and a touch controller 1708. In some instances, at least one touch sensor component 1706 resides with, or is stacked on, the display 1702 to form a touch-sensitive display (e.g., an electronic paper touch-sensitive display). Thus, the display 1702 may be capable of both accepting user touch input and rendering content in response to or corresponding to the touch input. As several examples, the touch sensor component 1706 may comprise a capacitive touch sensor, a force sensitive resistance (FSR), an interpolating force sensitive resistance (IFSR) sensor, or any other type of touch sensor. In some instances, the touch sensor component 1706 is capable of detecting touches as well as determining an amount of pressure or force of these touches.

FIG. 17 further illustrates that the electronic device 1700 may include one or more processors 1710 and one or more computer-readable media 1712, as well as a front light component 1714 (which may alternatively be a backlight component in the case of a backlit display) for lighting the display 1702, a cover layer component 1716, such as a cover glass or cover sheet, one or more communication interfaces 1718 and one or more power sources 1720. The communication interfaces 1718 may support both wired and wireless connection to various networks, such as cellular networks, radio, WiFi networks, short range networks (e.g., Bluetooth®), infrared (IR), and so forth.

Depending on the configuration of the electronic device 1700, the computer-readable media 1712 (and other computer-readable media described throughout) is an example of computer storage media and may include volatile and non-volatile memory. Thus, the computer-readable media 1712 may include, but is not limited to, RAM, ROM, EEPROM, flash memory, or other memory technology, or any other medium that may be used to store computer-readable instructions, programs, applications, media items, and/or data which may be accessed by the electronic device 1700.

The computer-readable media 1712 may be used to store any number of functional components that are executable on the processor 1710, as well as content items 1722 and applications 1724. Thus, the computer-readable media 1712 may include an operating system and a storage database to store one or more content items 1722, such as eBooks, audio books, songs, videos, still images, and the like. The computer-readable media 1712 of the electronic device 1700 may also store one or more content presentation applications to render content items on the device 1700. These content presentation applications may be implemented as various applications 1724 depending upon the content items 1722. For instance, the content presentation application may be an electronic book reader application for rending textual electronic books, an audio player for playing audio books or songs, a video player for playing video, and so forth.

In some instances, the electronic device 1700 may couple to a cover (not illustrated in FIG. 17) to protect the display (and other components in the display stack or display assembly) of the device 1700. In one example, the cover may include a back flap that covers a back portion of the device 1700 and a front flap that covers the display 1702 and the other components in the stack. The device 1700 and/or the cover may include a sensor (e.g., a Hall Effect sensor) to detect if the cover is open (i.e., if the front flap is not atop the display and other components). The sensor may send a signal to the front light component 1714 if the cover is open and, in response, the front light component 1714 may illuminate the display 1702. If the cover is closed, meanwhile, the front light component 1714 may receive a signal indicating that the cover has closed and, in response, the front light component 1714 may turn off.

Furthermore, the amount of light emitted by the front light component 1714 may vary. For instance, upon a user opening the cover, the light from the front light may gradually increase to its full illumination. In some instances, the device 1700 includes an ambient light sensor (not illustrated in FIG. 17) and the amount of illumination of the front light component 1714 may be based at least in part on the amount of ambient light detected by the ambient light sensor. For example, the front light component 1714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1702 may vary depending on whether the front light component 1714 is on or off, or based on the amount of light provided by the front light component 1714. For instance, the electronic device 1700 may implement a larger default font or a greater contrast if the light is off compared to if the light is on. In some instances, the electronic device 1700 maintains, if the light is on, a contrast ratio for the display that is within a certain defined percentage of the contrast ratio if the light is off.

As described above, the touch sensor component 1706 may comprise a capacitive touch sensor that resides atop the display 1702. In some examples, the touch sensor component 1706 may be formed on or integrated with the cover layer component 1716. In other examples, the touch sensor component 1706 may be a separate component in the stack of the display assembly. The front light component 1714 may reside atop or below the touch sensor component 1706. In some instances, either the touch sensor component 1706 or the front light component 1714 is coupled to a top surface of a protective sheet 1726 of the display 1702. As one example, the front light component 1714 may include a lightguide sheet and a light source (not illustrated in FIG. 17). The lightguide sheet may comprise a substrate (e.g., a transparent thermoplastic such as PMMA or other acrylic), a layer of lacquer and multiple grating elements formed in the layer of lacquer that function to propagate light from the light source towards the display 1702, thus illuminating the display 1702.

The cover layer component 1716 may include a transparent substrate or sheet having an outer layer that functions to reduce at least one of glare or reflection of ambient light incident on the electronic device 1700. In some instances, the cover layer component 1716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 1726 may include a similar UV-cured hard coating on the outer surface. The cover layer component 1716 may couple to another component or to the protective sheet 1726 of the display 1702. The cover layer component 1716 may, in some instances, also include a UV filter, a UV-absorbing dye, or the like, for protecting components lower in the stack from UV light incident on the electronic device 1700. In still other examples, the cover layer component 1716 may include a sheet of high-strength glass having an antiglare and/or antireflective coating.

The display 1702 includes the protective sheet 1726 overlying an image-displaying component 1728. For example, the display 1702 may be preassembled to have the protective sheet 1726 as an outer surface on the upper or image-viewing side of the display 1702. Accordingly, the protective sheet 1726 may be integral with and may overlay the image-displaying component 1728. The protective sheet 1726 may be optically transparent to enable a user to view, through the protective sheet 1726, an image presented on the image-displaying component 1728 of the display 1702.

In some examples, the protective sheet 1726 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1726 may include a coating, such as the hard coating described above. For instance, the hard coating may be applied to the outer surface of the protective sheet 1726 before or after assembly of the protective sheet 1726 with the image-displaying component 1728 of the display 1702. In some examples, the hard coating may include a photoinitiator or other reactive species in its composition, such as for curing the hard coating on the protective sheet 1726. Furthermore, in some examples, the protective sheet 1726 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1726, thereby protecting the image-displaying component 1728 from UV light.

According to some implementations herein, one or more of the components discussed above may be coupled to the display 1702 using fluid optically-clear adhesive (LOCA). For example, suppose that the light guide portion of the front light component 1714 is to be coupled to the display 1702. The light guide may be coupled to the display 1702 by placing the LOCA on the outer or upper surface of the protective sheet 1726. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1714 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1714. In other implementations, the LOCA may be placed near a center of the protective sheet 1726, and pressed outwards towards a perimeter of the top surface of the protective sheet 1726 by placing the front light component 1714 on top of the LOCA. The LOCA may then be cured by directing UV light through the front light component 1714. As discussed above, and as discussed additionally below, various techniques, such as surface treatment of the protective sheet, may be used to prevent discoloration of the LOCA and/or the protective sheet 1726.

While FIG. 17 illustrates a few example components, the electronic device 1700 may have additional features or functionality. For example, the device 1700 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 1700 may reside remotely from the device 1700 in some implementations. In these implementations, the device 1700 may utilize the communication interfaces 1718 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
   a bottom support plate;
   a top support plate positioned above the bottom support plate and substantially parallel to the bottom support plate, wherein a space between the bottom support plate and the top support plate includes a plurality of pixel regions for presenting content on the electrowetting display device, wherein a pixel region of the plurality of pixel regions includes:
      a pixel electrode disposed on a side of the bottom support plate facing the top support plate;
      a hydrophobic layer disposed on the pixel electrode;
      an electrowetting oil disposed on the hydrophobic layer;
      an electrolyte solution at least partially surrounding the electrowetting oil, wherein the electrolyte solution has a first refractive index;
      a thin film transistor (TFT) disposed on the bottom support plate, wherein the TFT is electrically coupled to the pixel electrode, and wherein application of a voltage between the pixel electrode and the electrolyte solution decreases hydrophobicity of the hydrophobic layer to allow the electrolyte solution to move onto the hydrophobic layer and substantially displace at least a portion of the electrowetting oil toward an edge of the pixel region; and
      transparent diffuser elements formed of a transparent material, the transparent diffuser elements protruding into the electrolyte solution from the top support plate, wherein recesses separate the transparent diffuser elements from one another, and wherein the transparent material of the transparent diffuser elements has a second refractive index substantially different from the first refractive index.

2. The electrowetting display device of claim 1, further comprising a transparent electrically conductive layer at least partially covering the transparent diffuser elements, wherein the transparent electrically conductive layer is in electrical contact with the electrolyte solution to provide the voltage between the pixel electrode and the electrolyte solution.

3. The electrowetting display device of claim 1, wherein distances that a first group of the transparent diffuser elements respectively protrude into the electrolyte solution are different from distances that a second group of the transparent diffuser elements respectively protrude into the electrolyte solution.

4. The electrowetting display device of claim 1, wherein at least a portion of the transparent diffuser elements comprises transparent colored material that is transparent to a particular spectral portion of light.

5. The electrowetting display device of claim 1, wherein each of the plurality of pixel regions is partitioned from one another by pixel walls and the transparent diffuser elements are over a region between an adjacent pair of the pixel walls.

6. An electrowetting display device comprising:
   a first support plate that includes a pixel area at least partially surrounded by pixel walls;
   a second support plate substantially parallel to the first support plate;
   a fluid disposed between the first support plate and the second support plate;
   transparent diffuser elements formed of a transparent material, the transparent diffuser elements disposed over the pixel area and protruding into the fluid from the second support plate, wherein recesses separate the transparent diffuser elements from one another; and
   a transparent electrically conductive layer at least partially disposed on the second support plate between the transparent diffuser elements, wherein the transparent electrically conductive layer is in electrical contact with the fluid.

7. The electrowetting display device of claim 6, wherein at least a portion of the transparent diffuser elements comprises transparent colored material that is transparent to a particular spectral portion of light.

8. The electrowetting display device of claim 6, wherein the transparent electrically conductive layer comprises indium tin oxide (ITO).

9. The electrowetting display device of claim 6, wherein the transparent diffuser elements and the second support plate are a unitary structure, and wherein the transparent electrically conductive layer covers the transparent diffuser elements.

10. The electrowetting display device of claim 6, wherein a refractive index of the transparent material of the transparent diffuser elements is greater than a refractive index of the second support plate.

11. The electrowetting display device of claim 6, wherein distances that a first group of the transparent diffuser elements respectively protrude into the fluid are different from distances that a second group of the transparent diffuser elements respectively protrude into the fluid.

12. The electrowetting display device of claim 6, wherein at least a portion of the transparent diffuser elements are disposed in a pattern on the second support plate, wherein the pattern comprises substantially concentric circles.

13. The electrowetting display device of claim 6, further comprising:

a reflective layer disposed on a surface of the first support plate, wherein the reflective layer is adjacent to the fluid; and a hydrophobic layer at least partially covering the reflective layer, wherein the reflective layer comprises a substantially electrically conductive material.

14. The electrowetting display device of claim 6, wherein the fluid comprises an electrolyte solution.

15. A method for fabricating a portion of an electrowetting display device, the method comprising:

depositing a transparent material layer on a first support plate;

placing a pattern mask on the transparent material layer;

etching portions of the transparent material layer to form a patterned transparent material layer comprising, recesses in the transparent material layer, and wherein the patterned transparent material layer includes diffuser elements separated by the recesses;

depositing a transparent electrically conductive layer on the patterned transparent material layer so that the transparent electrically conductive layer is disposed on at least a portion of the first support plate; and laminating a top portion of the electrowetting display device to a bottom portion of the electrowetting display device that includes pixel walls, a fluid, and a substantially reflective surface formed on a second support plate, wherein the diffuser elements and the recesses are over an area of the second support plate between the pixel walls, and wherein the transparent electrically conductive layer is exposed to the fluid.

16. The method of claim 15, wherein the laminating the top portion of the electrowetting display device to the bottom portion of the electrowetting display device results in the diffuser elements protruding into the fluid.

17. The method of claim 15, wherein the transparent material layer comprises a transparent colored material that is transparent to a particular spectral portion of light.

18. The method of claim 15, wherein the patterned transparent material layer that includes the diffuser elements and recesses is patterned so that distances among the diffuser elements vary.

* * * * *